Patented Jan. 15, 1929.

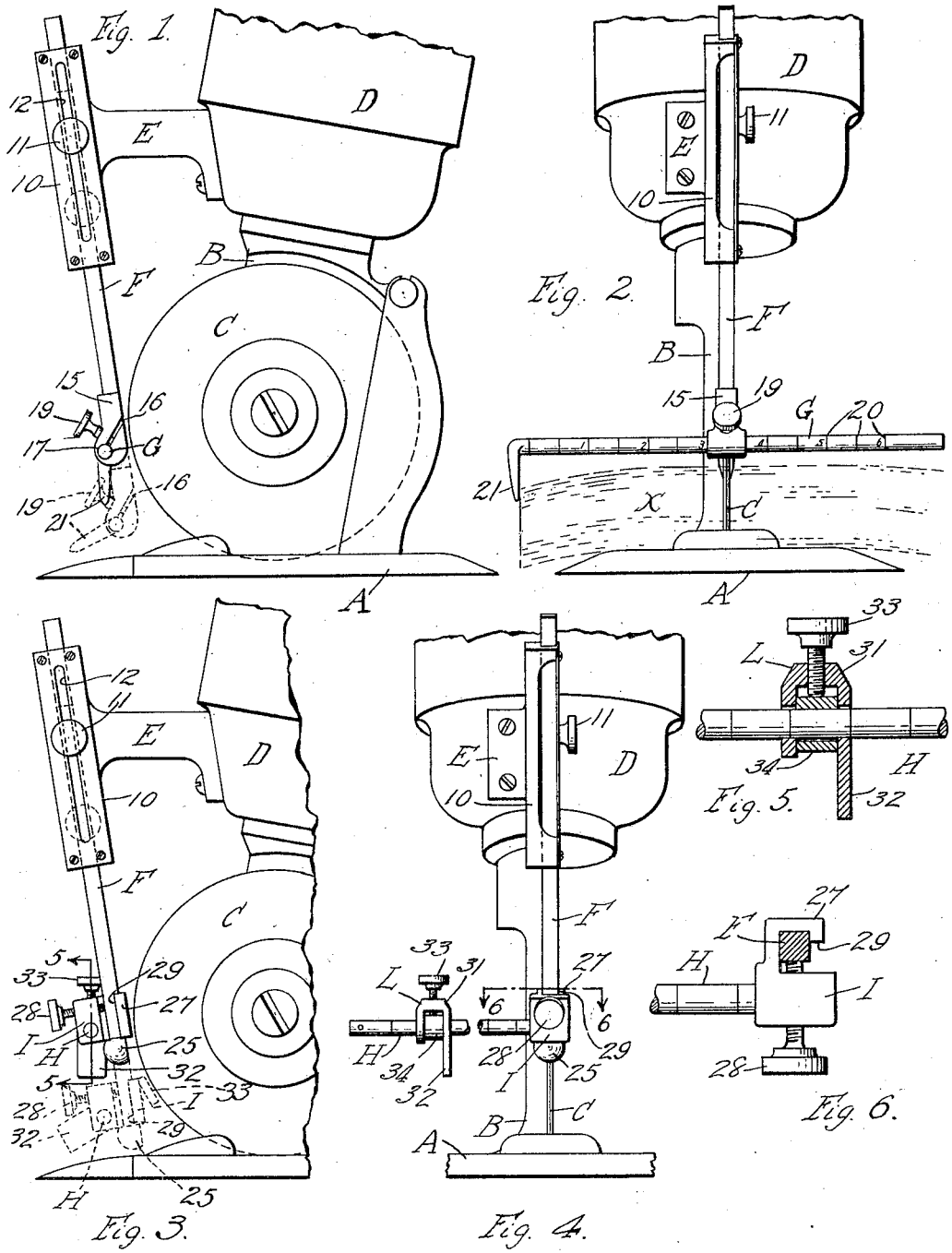

1,699,462

UNITED STATES PATENT OFFICE.

FREDERICK J. CLARK, OF BUFFALO, NEW YORK, ASSIGNOR TO EASTMAN MACHINE COMPANY, OF BUFFALO, NEW YORK.

GAUGE FOR CLOTH-CUTTING MACHINES.

Application filed June 20, 1927. Serial No. 199,930.

This invention relates to improvements in cloth cutting machines, and more particularly to means for use on a cloth cutting machine for assisting in guiding the machine when the same is used for cutting material at a distance from an edge or line thereon.

The objects of this invention are to provide a cloth cutting machine with a gauge of improved construction which is readily adjustable for adapting the machine to cut material at different distances from an edge or other mark thereon; also to provide a gauge of this kind of improved construction which is adjustable toward and from the goods to be cut by means of the same mechanism which is employed for adjusting the usual knife guard of the machine; also to improve gauges for cloth cutting machines in other respects hereinafter specified.

In the accompanying drawings,

Fig. 1 is a fragmentary, side elevation of a cloth cutting machine having guard means and a gauge, embodying this invention, applied thereto.

Fig. 2 is a fragmentary, front elevation thereof.

Fig. 3 is a fragmentary, side elevation thereof, showing a machine provided with a gauge of modified construction.

Fig. 4 is a front elevation thereof.

Fig. 5 is a fragmentary, sectional view thereof, on an enlarged scale, on line 5—5, Fig. 3.

Fig. 6 is a fragmentary, plan view thereof on line 6—6, Fig. 4.

My improvement may be applied to any suitable or desired kind of cloth cutting machine, the particular machine shown in the drawings including the usual base A which is adapted to be moved over a supporting surface (not shown) on which the cloth or other material to be cut is laid, the base having an upwardly extending standard B on which the knife C of the machine is journalled, and D represents the housing of the motor which drives the knife. The front of the motor housing is provided with any usual or suitable guard means, including a guard supporting bracket E which may also be of any suitable or desired construction, that shown having a guideway 10 in which a knife guard F is slidably mounted, an adjusting screw 11, extending through a slot 12 in the side of the guide 10, serving to secure the guard F at different elevations, depending upon the thickness of the layer X of cloth or other material to be cut. The knife guard shown serves the usual purpose of preventing the hand of the operator from coming in contact with the knife as the machine is advanced to the goods, and in order to fully protect the operator it is desirable that the knife guard should always be lowered as far as possible, preferably into contact or approximately into contact with the top surface of the material which is to be cut.

Cloth cutting machines of this kind are generally employed for cutting cloth in accordance with the contour of a pattern placed on top of the cloth. Occasionally it is necessary, however, to use a cloth cutting machine for cutting material into strips of uniform width, such, for example, as is the case for cutting bandage cotton, or for making cuts in the material at a definite distance from an edge, line or other mark on the material. Consequently it is desirable to have a gauge by means of which the operator is guided in cutting the material in this manner and which gauge can be readily removed from the machine when the machine is used in the ordinary manner. I have also found that the best results can be obtained by mounting the gauge on the knife guard F in such a manner that the gauge cannot be used unless the knife guard is lowered into its operative position, thus assuring the safety of the operator while using the machine. The gauge may, however, be mounted on the guard bracket or other part of the guard means.

In the particular embodiment of my invention shown in Figs. 1 and 2 the lower end of the knife guard is provided with a suitable clamping device 15, which is fixed or permanently secured thereon and which is split or slotted as shown at 16, the slot 16 terminating in a substantially, transverse, cylindrical opening 17 in which a bar G of the gauge is adjustably secured. 19 represents a clamp screw extending across the slot 16 and adapted to be tightened for clamping the gauge bar G in place. The gauge bar may be provided with the usual graduations 20 to facilitate in positioning the same and at one end the gauge includes a downwardly projecting gauge arm 21, which, as clearly shown in Fig. 2, is adapted to cooperate with the edge of the body of material X which it is desired to cut into strips, or which may cooperate with any other mark or line on the material to be cut. By adjusting the gauge bar lengthwise, relatively to the knife guard, the gauge may be used in connection with the making of cuts at any desired distance from the edge or mark on the material, and if the cuts are to be made from the opposite edge of the layer of cloth, the gauge bar G may be readily removed from its cylindrical recess 17 and reversed so that the downward projection or arm 21 is arranged at the opposite side of the machine. When the gauge is not necessary, it is simply removed from the knife guard, in which case the holder 15 functions as a part of the guard, the lower end thereof being rounded so as to readily move over the material which is to be cut.

In the use of the device, the gauge bar G is first set so that the arm 21 thereof is at the desired distance from the knife, this setting being facilitated by the graduations 20 on the gauge. The knife guard is then lowered so that the arm 21 can engage with the edge or other mark the stack of cloth X. The arm 21 is preferably made short enough so that the lowering of the guard into its operative position is necessary in order to render the gauge operative.

In the construction shown in Figs. 3 to 6, the guard F is of the same construction heretofore commonly employed being provided with a rounded lower end portion 25 adapted to move over the surface of the stack of cloth. In this construction a gauge bar H extends transversely of the machine and is held in place by means of a bracket I adapted to be removably secured on the guard bar F. In the construction shown for this purpose the gauge bar is rigidly secured to the bracket I, which bracket is provided with a hooked portion 27 adapted to engage the rear face and two sides of the guard F, a screw 28 passing through the bracket I to engage the guard F for clamping the bracket on the guard. When it is desired to remove the gauge from the machine, the screw 28 is loosened so that the bracket may be disengaged from the guard by causing the guard to pass through the slot 29 between the body portion of the bracket I and the hooked portion 27. In order to adjust the gauge to make cuts at different distances from an edge or mark, or to cut strips of cloth of different widths, an adjustable arm L is provided on the gauge bar H, this arm, in the particular construction shown, including a U-shaped portion 31 having holes in opposite sides thereof through which the gauge bar H passes, and one of the legs 32 of the U-shaped portion extends downwardly to cooperate with the edge of or a mark on the material for guiding the operator in the correct cutting of the material. This arm may be adjustably secured on the gauge bar H in any suitable manner, for example, by means of a set screw 33 having a threaded engagement in the U-shaped portion 31 of the arm and engaging a sleeve 34 arranged about the gauge bar H and between the legs of the U-shaped portion 31. Consequently by tightening the screw 33 against the sleeve 34, the U-shaped portion of the adjustable arm is drawn tightly against the gauge bar H. Any other means for adjustably securing the gauge arm on the gauge bar H and for detachably mounting the gauge bar on the guard member F may be employed, if desired. The construction shown in Figs. 3 to 6 has the advantage that this gauge member may be secured to the guard of cloth cutting machines as now commonly constructed.

In both constructions shown, a lowering of the guard into its operative position is necessary in order to use the gauge, so that the safety of the operator when using the machine in connection with the gauge is insured. Furthermore by mounting the gauge on the guard member, only a lateral adjustment of the gauge need be provided for since the adjustment of the gauge toward and from the work is provided for by the adjusting means of the guard.

I claim as my invention:—

1. In a cloth cutting machine, the combination of a movable cutting member, guard means extending in front of said cutting member and adjustable up and down, and a gauge removably mounted on a part of said guard means and adapted to cooperate with a mark on the cloth for guiding an operator in making a cut at a definite distance from said mark.

2. In a cloth cutting machine, the combination of a movable cutting member, guard means extending in front of said cutting member, and a gauge adapted to cooperate with a mark on the cloth for guiding an operator in making a cut at a definite distance from said mark and adjustably mounted on a part of said guard means to vary the distance of the cut from said mark.

3. In a cloth cutting machine, the combination of a movable cutting member, a guard mounted on said machine and adjustable up and down in front of said cutting member, and a gauge mounted on said guard to move up and down therewith and including a part adjustable laterally of the machine.

4. In a cloth cutting machine, the combination of a movable cutting member, a guard mounted on said machine and adjustable up and down in front of said cutting member, a gauge including a part adjustable laterally of said machine, and means for removably mounting said gauge on said guard.

5. In a cloth cutting machine, the combination of a movable cutting member, a guard mounted on said machine and adjustable up and down in front of said cutting member, a clamping device on said guard, and gauge means mounted on said clamping member and movable up and down with said guard and including a part adjustable laterally relatively to the guard.

6. In a cloth cutting machine, the combination of a movable cutting member, a guard mounted on said machine and adjustable up and down in front of said cutting member, a gauge including a bar extending transversely of the machine and a comparatively short downwardly extending arm on said bar adjustable laterally with reference to said guard, and means for mounting said bar on said guard.

7. In a cloth cutting machine, the combination of a movable cutting member, a guard mounted on said machine and adjustable up and down in front of said cutting member, a gauge mounted on said guard to move up and down therewith and including a part adjustable laterally of the machine, and means for clamping said part in fixed relation with reference to said guard.

8. In a cloth cutting machine, the combination of a movable cutting member, a guard mounted on said machine, a gauge mounted on said guard and including a part adjustable laterally with reference to said guard, and means for adjustably securing said guard in different elevations, which means produce corresponding adjustments of said part.

FREDERICK J. CLARK.